(12) United States Patent
Thomas

(10) Patent No.: US 12,553,798 B2
(45) Date of Patent: Feb. 17, 2026

(54) SYSTEMS AND METHODS FOR VEHICLE BRAKING AND COLLISION SIMULATIONS USING HUMAN PASSENGERS

(71) Applicant: GM GLOBAL TECHNOLOGY OPERATIONS LLC, Detroit, MI (US)

(72) Inventor: Scott D Thomas, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 381 days.

(21) Appl. No.: 18/332,651

(22) Filed: Jun. 9, 2023

(65) Prior Publication Data

US 2024/0410790 A1    Dec. 12, 2024

(51) Int. Cl.
*G01M 17/007* (2006.01)
*G06F 30/20* (2020.01)

(52) U.S. Cl.
CPC ......... *G01M 17/0078* (2013.01); *G06F 30/20* (2020.01)

(58) Field of Classification Search
CPC ............... G01M 17/0078; G06F 30/20; B60R 2021/022; B60R 2022/288; B60R 2011/0012; B60N 2/42; B60N 2/04; B60N 2/28
See application file for complete search history.

(56) References Cited

U.S. PATENT DOCUMENTS

2022/0134913 A1* 5/2022 Skaria .................... B60K 35/80
701/49

OTHER PUBLICATIONS

Thomas, S. et al. U.S. Appl. No. 18/080,830, filed Dec. 14, 2022. Motor vehicle with selective airbag suppression based on occupant position and seatbelt usage.
Thomas, S. et al. U.S. Appl. No. 18/081,133, filed Dec. 14, 2022. Vehicle with occupant trajectory-based airbag suppression.

* cited by examiner

*Primary Examiner* — Stephen D Meier
*Assistant Examiner* — Quang X Nguyen
(74) *Attorney, Agent, or Firm* — Ingrassia Fisher & Lorenz, LLP | IF&L

(57) ABSTRACT

Systems and methods are provided for vehicle braking, collision, or braking and collision simulations. The systems include a seat platform configured to be secured within a vehicle such that the seat platform is located on or above a seat of the vehicle, the seat platform configured to be controllably displaced relative to the vehicle seat in at least a forward direction towards the front of the vehicle while having a passenger disposed on the seat platform during a deceleration simulation that includes displacing the seat platform having the passenger disposed thereon from an initial position toward the front of the vehicle, one or more sensors configured to gather sensor data indicative of spatial characteristics of the passenger during the deceleration simulation, wherein at least one of the sensors is a sensor of the vehicle.

20 Claims, 10 Drawing Sheets

Cross-Section B-B

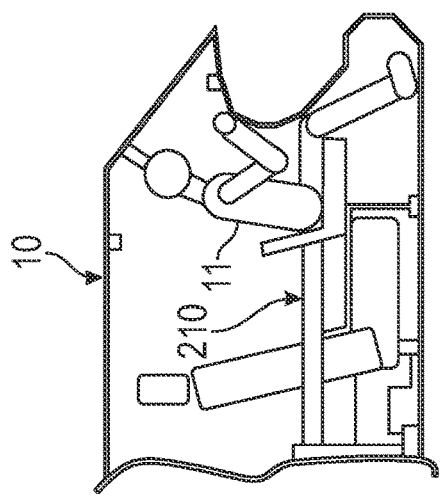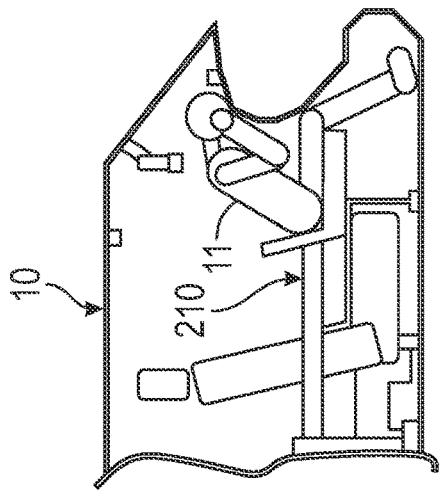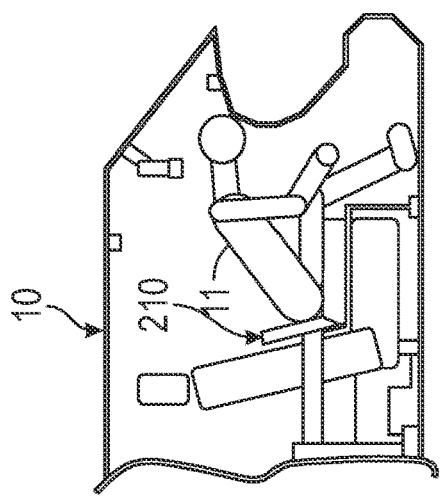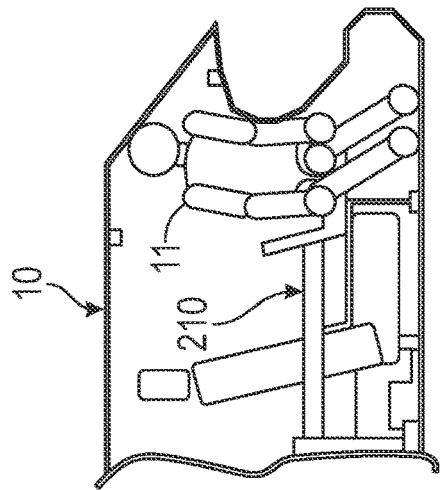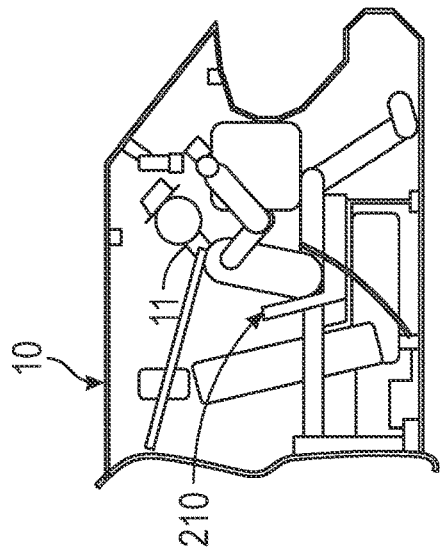

SYSTEMS AND METHODS FOR VEHICLE BRAKING AND COLLISION SIMULATIONS USING HUMAN PASSENGERS

The technical field generally relates to vehicle braking and collision simulations, and more particularly relates to a vehicle braking and collision simulation system and methods of performing vehicle braking and collision simulations in a manner that safely allows for inclusion of a human passenger.

Vehicle braking and collision simulations are commonly performed to analyze and promote improvement of the safety of vehicles. In general, it is unsafe to conduct vehicle braking and collision simulations using living passengers, especially unrestrained ones. Therefore, vehicle braking and collision simulations are often conducted by crashing a vehicle while using artificial passengers, such as global human body models or Anthropomorphic Test Devices (ATDs; commonly referred to as crash test dummies). While artificial passengers are useful alternatives to human passengers, there is an ongoing desire for improved vehicle braking and collision simulation techniques which accurately depict the movements and/or positions of human passengers.

Accordingly, it is desirable to provide systems and methods for vehicle braking and collision simulations that incorporate bodily movements and/or positions of passengers similar to those that may occur by human passengers during actual vehicle braking and collision events. Furthermore, other desirable features and characteristics of the present invention will become apparent from the subsequent detailed description and the appended claims, taken in conjunction with the accompanying drawings and the foregoing technical field and background.

SUMMARY

A system is provided for deceleration simulations. In one embodiment, the system includes a seat platform configured to be secured within a vehicle such that the seat platform is located on or above a seat of the vehicle, the seat platform configured to be controllably displaced relative to the seat in at least a forward direction towards the front of the vehicle while having a passenger disposed on the seat platform during a deceleration simulation that includes displacing the seat platform having the passenger disposed thereon from an initial position toward the front of the vehicle, and one or more sensors configured to gather sensor data indicative of spatial characteristics of the passenger during the deceleration simulation. At least one of the sensors is a sensor of the vehicle.

In various embodiments, the system includes a computing system configured to, by one or more processors: receive the sensor data from the one or more sensors, and generate simulation input data based on the sensor data indicative of at least one of movements or positions of the passenger sensed by the one or more sensors during the deceleration simulation.

In various embodiments, the computing system is configured to, by the one or more processors, generate the simulation input data such that the simulation input data is usable to train, validate, and/or implement an algorithm for an airbag suppression system.

In various embodiments, the system includes a propulsion apparatus configured to controllably displace the seat platform in at least one of the forward direction towards the front of the vehicle and a rearward direction towards the rear of the vehicle.

In various embodiments, the propulsion apparatus is configured to displace the seat platform during the deceleration simulation at a rate of speed sufficiently slow such that the passenger remains unharmed.

In various embodiments, the system includes a frame configured to be secured within the vehicle in a fixed position, and a slider assembly coupling the seat platform to the frame. In various embodiments, the system further includes a propulsion apparatus that includes a motor operable to controllably displace the seat platform in at least one of the forward direction towards the front of the vehicle and a rearward direction towards the rear of the vehicle on the slider assembly.

In various embodiments, the system includes a contact sensor or a force sensor located within the vehicle and towards the front of the vehicle relative to the seat, wherein the contact sensor or the force sensor is configured to cease displacement of the seat platform in the forward direction in response to sensing contact therewith or a force applied thereto that exceeds a threshold.

In various embodiments, the one or more sensors includes at least one sensor of the vehicle.

In various embodiments, the simulation input data further includes one or more simulated operational parameters that are mapped over time to the displacement of the seat platform.

In various embodiments, the computing system is configured to, by the one or more processors: generate the simulation input data to include a plurality of data points indicative of the movements or positions of the passenger as sensed by the one or more sensors at a first sample rate, and then modify the simulation input data to change the first sample rate to a second sample rate, wherein the second sample rate has a time domain associated with a real-time vehicle braking event, a real-time collision event, or a real-time braking and collision event.

In various embodiments, the computing system is configured to, by the one or more processors, modify the simulation input data by: reducing a duration of time between at least some of the plurality of data points, eliminating some of the data points to reduce a duration of the deceleration simulation, eliminating some of the data points and reducing a duration of time between at least some of the remaining data points, or adding additional data points in response to preprogramed conditions.

A method is provided for deceleration simulations. In one embodiment, the method includes initiating a deceleration simulation that includes displacing a seat platform of a movement simulation apparatus secured within a vehicle and having a passenger disposed thereon from an initial position in a forward direction toward a front of the vehicle, wherein the seat platform is located on or above a seat of the vehicle, and sensing with one or more sensors sensor data indicative of at least one of movements or positions of the passenger during the deceleration simulation.

In various embodiments, the method includes obtaining, by a computing system that includes one or more processors, the sensor data from one or more sensors, and generating, by a computing system with one or more processors, simulation input data based on the sensor data.

In various embodiments, the method includes using the simulation input data to train, validate, and/or implement an algorithm for an airbag suppression system.

In various embodiments, displacing the seat platform having the passenger disposed thereon is performed by operating a propulsion apparatus of the movement simulation apparatus.

In various embodiments, performing the deceleration simulation includes ceasing movement of the seat platform in the forward direction in response to contact by the passenger or an object with a contact sensor or a force sensor located within the vehicle and towards the front of the vehicle relative to the seat.

In various embodiments, at least one of the one or more sensors is a sensor of the vehicle.

In various embodiments, the simulation input data further includes one or more simulated operational parameters that are mapped over time to the displacement of the seat platform.

In various embodiments, displacing the seat platform of the movement simulation apparatus is performed at a rate of speed sufficiently slow such that the passenger remains unharmed.

In various embodiments, the simulation input data include a plurality of data points indicative of the movements or positions of the passenger as sensed by the one or more sensors at a first sample rate, wherein the method includes modifying, by the computing system with the one or more processors, the simulation input data to change the first sample rate to a second sample rate, wherein the second sample rate has a time domain associated with a real-time vehicle braking event, a real-time vehicle collision event, or a real-time vehicle braking and collision event.

In various embodiments, modifying the simulation input data is performed by reducing a duration of time between at least some of the data points, eliminating some of the data points to reduce a duration of the deceleration simulation, eliminating some of the data points and reducing a duration of time between at least some of the remaining data points, or adding additional data points in response to preprogramed conditions.

BRIEF DESCRIPTION OF THE DRAWINGS

The exemplary embodiments will hereinafter be described in conjunction with the following drawing figures, wherein like numerals denote like elements, and wherein:

FIGS. 14-18 represent various forward positions of a passenger during deceleration simulations produced by the method of FIG. 10 and the system of FIGS. 1 and 7.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
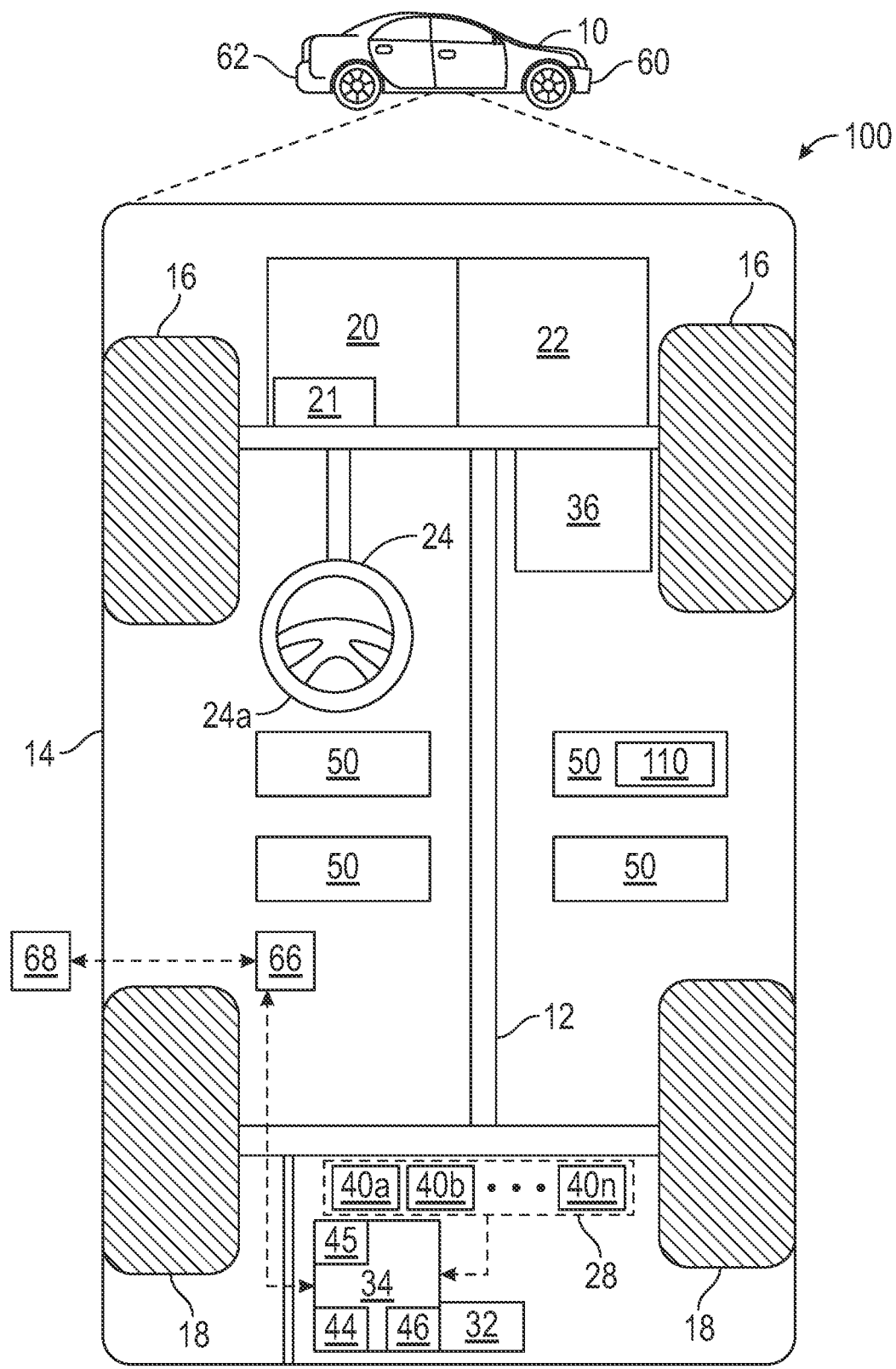
FIG. 1 is a functional block diagram of a vehicle having a vehicle collision simulation system installed therein, in accordance with various embodiments.

FIG. 1 represents aspects of a vehicle 10 that includes an exemplary vehicle braking and collision simulation system 100 installed therein in accordance with various embodiments. The system 100 is configured for sensing spatial characteristics of a passenger 11 (e.g., a human passenger) of the vehicle 10 during a panic braking simulation, a collision simulation, or a panic braking and collision simulation (collectively referred to herein as deceleration simulations) and generating simulation input data corresponding to sensed movements and positions of the passenger 11. In various embodiments, the deceleration simulation may be performed without actual operation of the vehicle 10, without damaging the vehicle 10 or at least without causing the vehicle 10 to be in a collision, and/or without causing harm to the passenger 11 (e.g., even when the passenger 11 is not wearing a seat belt). For example, the system 100 may be configured for use in a deceleration simulation that includes maintaining the vehicle 10 in a stationary position, displacing the passenger 11 within the vehicle 10 towards a front of the vehicle 10 at a relatively low rate of speed, and obtaining sensor data with, for example, one or more sensors of the vehicle 10 indicative of the motion of the passenger 11 during displacement thereof. This motion may be choreographed to reflect anticipated occupant movement in an actual braking, collision, or braking and collision event.

In various embodiments, the simulation input data generated by the system 100 may be used for training, validating, and/or implementing an algorithm for an airbag suppression system of the vehicle 10 or another vehicle. The algorithm may be used by the airbag suppression system to suppress deployment of an airbag during an actual panic braking and/or collision event based on sensed movements and/or positions of the passenger 11 of the vehicle 10. For example, the algorithm may suppress deployment of an airbag upon a determination that such action may reduce the likelihood of injury to the passenger 11 by the airbag. In addition, the simulation input data can be used for other purposes.

In various embodiments, the system 100 includes the vehicle 10. In certain embodiments, the vehicle 10 comprises an automobile. In various embodiments, the vehicle 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In addition, in various embodiments, it will also be appreciated that the vehicle 10 may comprise any number of other types of mobile platforms such as boats, trains, aircraft, etc.

As depicted in FIG. 1, the exemplary vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14. The vehicle 10 will be referred to herein as having a front 60 and a rear 62.

The vehicle 10 further includes a propulsion system 20, a transmission system 22, a steering system 24, a sensor system 28, at least one data storage device 32, at least one controller 34, at least one airbag system 36, one or more seats 50, and a communication system 66. The propulsion system 20 includes a motor or engine 21, such as internal combustion engine (e.g., a gasoline or diesel fueled combustion engine), an electric motor, or a hybrid system that includes two or more different types of engines and/or motors. The transmission system 22 is configured to transmit power from the propulsion system 20 to the wheels 16-18 according to selectable speed ratios. According to various embodiments, the transmission system 22 may include a step-ratio automatic transmission, a continuously-variable transmission, or other appropriate transmission. The steering system 24 influences a position of the wheels 16-18. While depicted as including a steering wheel 24a for illustrative purposes, in some embodiments contemplated within the scope of the present disclosure, the steering system 24 may not include a steering wheel.

The sensor system 28 includes one or more sensing devices 40a-40n that sense observable conditions of the exterior environment, the interior environment, and/or a status or condition of a corresponding component of the vehicle 10, generate sensor data indicative of such condition and/or status, and provide such sensors data to other systems of the vehicle 10, such as the controller 34, or a remote system with a communication system of the vehicle. It should be understood that the vehicle 10 may include any number of the sensing devices 40a-40n. The sensing devices 40a-40n can include, but are not limited to, inertia measuring sensors, vehicle speed sensors, weight sensors, torque sensors, wheel speed sensors, engine torque sensors, suspension deflection measurement sensors, ultra-sonic sensors, laser displacement sensors, RADAR sensors, LIDAR sensors, infrared light sensors, camera vision sensors, steering wheel angle sensors, brake pressure sensors, pedal position sensors, strain gages, seat sensors, fuel level sensors, etc. Also, one or more of the sensing device 40a-40n may be located within an interior of the vehicle 10. Such interior sensors can include, but are not limited to, the following types of sensors: Time of Flight Cameras, Stereo Cameras, Structured Light Cameras, Thermal Cameras, IR/RGB Cameras, LIDAR Sensors, Laser Profile Sensors, Ultrasound Sensors, Radar sensors, Capacitive Array sensors, Biometric Sensors, etc. Some of the sensing devices 40a-40n can be located in one or more of the seats 50 to detect occupant presence which may include some of the sensors mentioned above and may further include, but are not limited to, weight sensors, pressure sensors, capacitive sensors, and resistive sensors. In some embodiments, more than one of the sensor and/or more than one type of sensor can be used in combination as a system. The sensing devices 40a-40n are not limited to those expressly noted herein and other types of sensors could be included in the vehicle 10.

The data storage device 32 stores data for use in controlling the vehicle 10 and/or systems and components thereof. As can be appreciated, the data storage device 32 may be part of the controller 34, separate from the controller 34, or part of the controller 34 and part of a separate system. The data storage device 32 can be any suitable type of storage apparatus, including various different types of direct access storage and/or other memory devices. In one exemplary embodiment, the data storage device 32 comprises a program product from which a computer readable memory device can receive a program that executes one or more embodiments of one or more processes of the present disclosure, such as the steps of the process discussed further below in connection with FIG. 10. In another exemplary embodiment, the program product may be directly stored in and/or otherwise accessed by the memory device and/or one or more other disks and/or other memory devices. In various embodiments, one or more of the sensing devices 40a-40n can communicate with other entities 68 outside the vehicle 10 at a remote location and data transmitted therefrom can be saved, monitored, and/or processed at that remote location. The results from a processing can also optionally be communicated back to the vehicle 10, such as to the processor 44.

The controller 34 includes at least one processor 44, a communication bus 45, and a computer readable storage device or media 46. The processor 44 performs the computation and control functions of the controller 34. The processor 44 can be any custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMS (electrically PROM), EEPROMs (electrically erasable PROM), flash memory, or any other electric, magnetic, optical, or combination memory devices capable of storing data, some of which represent executable instructions, used by the controller 34 in controlling the vehicle 10. The bus 45 serves to transmit programs, data, status and other information or signals between the various components of the vehicle 10. The bus 45 can be any suitable physical or logical means of connecting computer systems and components. This includes, but is not limited to, direct hard-wired connections, fiber optics, infrared, and wireless bus technologies.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms, and generate data based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate data.

As can be appreciated, that the controller 34 may otherwise differ from the embodiment depicted in FIG. 1. For example, the controller 34 may be coupled to or may otherwise utilize one or more remote computer systems and/or other control systems, for example as part of one or more of the above-identified vehicle devices and systems. It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 44) to perform and execute the program. Such a program product may take a variety of forms, and the present disclosure applies equally regardless of the particular type of computer-readable signal bearing media used to carry out the distribution. Examples of signal bearing media include recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 34 may also otherwise differ from the embodiment depicted in FIG. 1, for example in that the computer system of the controller 34 may be coupled to or may otherwise utilize one or more remote computer systems and/or other control systems.

The airbag system 36 may include an airbag cushion, a control module (e.g., executed by the controller 34), an airbag inflator, and one or more crash sensors (e.g., one or more of the sensing devices 40*a-n*). The crash sensor(s) may be configured to detect a sudden deceleration that occurs during a collision event. When a collision occurs, the crash sensors send signals to the control module, which determines whether to deploy the airbags, for example, based on the severity of the impact. If the control module determines that airbag deployment is desired, the control module sends a signal to the airbag inflator, which then rapidly inflates the airbag cushion to reduce the likelihood of occupants from striking hard surfaces inside the vehicle 10, such as the steering wheel or instrument panel, which can cause serious injuries.

Still referring to FIG. 1, in exemplary implementations, the communication system 66 is configured to wirelessly communicate information to and from the other entities 68 over a communication network, such as but not limited to, other vehicles ("V2V" communication,) infrastructure ("V2I" communication), remote systems, and/or personal devices. In an exemplary implementation, the communication system 66 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The communication network utilized by the communication system 66 can include a wireless carrier system such as a cellular telephone system that includes a plurality of cell towers (not shown), one or more mobile switching centers (MSCs) (not shown), as well as any other networking components required to connect the wireless carrier system with a land communications system, and the wireless carrier system can implement any suitable communications technology, including for example, digital technologies such as CDMA (e.g., CDMA2000), LTE (e.g., 4G LTE or 5G LTE), GSM/GPRS, or other current or emerging wireless technologies. Additionally, or alternatively, a second wireless carrier system in the form of a satellite communication system can be utilized to provide uni-directional or bi-directional communication using one or more communication satellites (not shown) and an uplink transmitting station (not shown), including, but not limited to satellite radio services, satellite telephony services and/or the like. Some implementations may utilize a land communication system, such as a conventional land-based telecommunications network including a public switched telephone network (PSTN) used to provide hardwired telephony, packet-switched data communications, and the Internet infrastructure. One or more segments of a land communication system can be implemented using a standard wired network, a fiber or other optical network, a cable network, power lines, other wireless networks such as wireless local area networks (WLANs), or networks providing broadband wireless access (BWA), or any combination thereof.

In some embodiments, the communication system 66 and/or other components of the vehicle 10 may communicate to and from the other entities 68 via a wired connection. In some embodiments, data generated by the components of the vehicle 10, such as one or more of the sensing devices 40*a*-40*n*, may be transferred to and from the other entities 68 via a removable data storage media.

The vehicle braking and collision simulation system 100 further includes a movement simulation apparatus configured to be installed in the vehicle 10 and move or displace a passenger 11 in directions towards the front 60 or the rear 62 of the vehicle 10 relative to a first seat 50a of the seats 50. In general, the movement simulation apparatus includes a seat platform 110, a frame 118, a propulsion apparatus 126, and sliding assembly 134. Although the movement simulation apparatus is described in reference to the firsts seat 50a, it should be noted that the vehicle braking and collision simulation system 100 and the movement simulation apparatus can be applied to any of the seats 50 within the vehicle 10.

Figure 2:
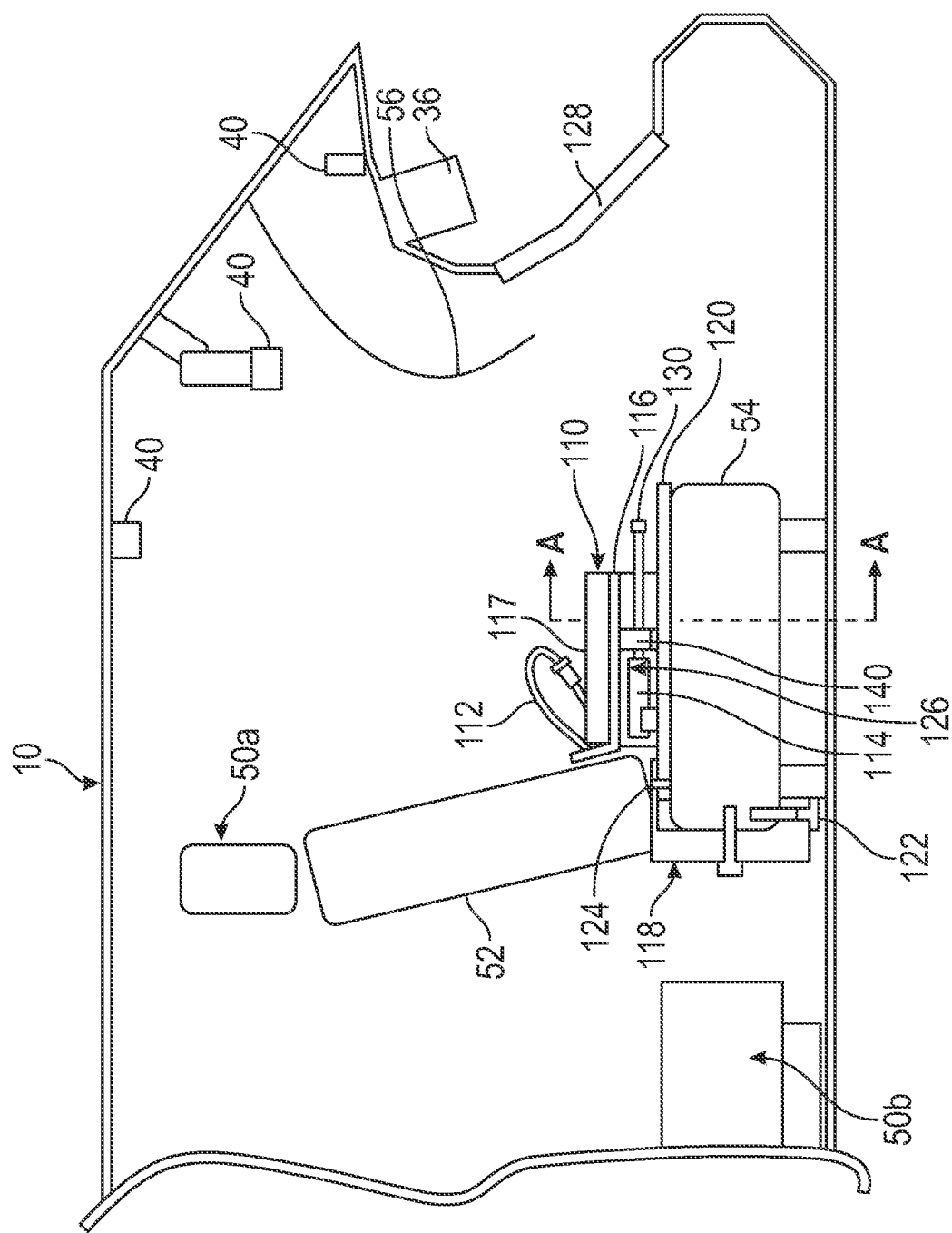
FIG. 2 is an isolated side view representing portions of the vehicle and vehicle collision simulation system of FIG. 1, including a movement simulation apparatus in accordance with a first embodiment.
Figure 3:
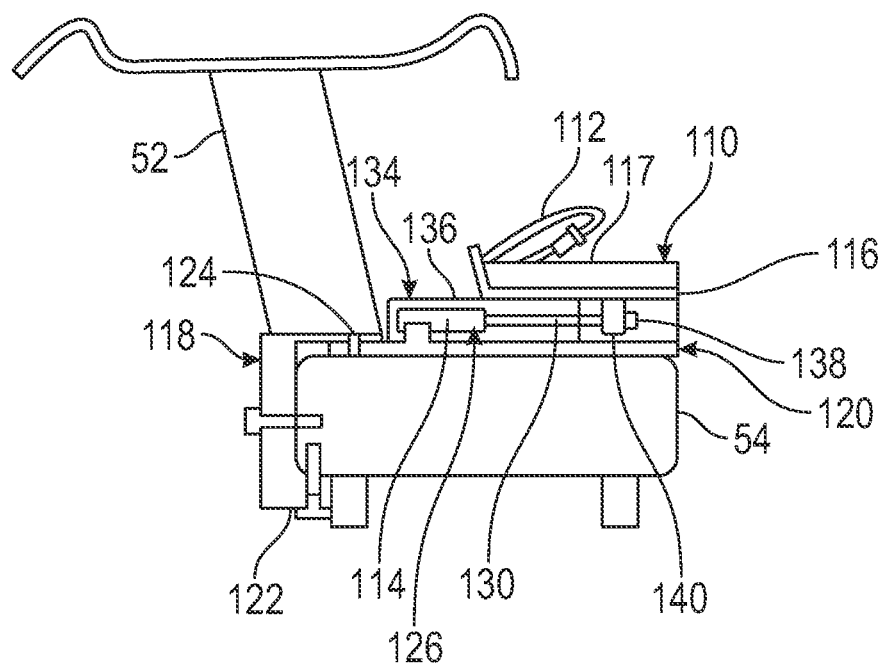
FIG. 3 is a side cross-sectional view of the movement simulation apparatus of FIG. 4 viewed along line B-B.
Figure 4:
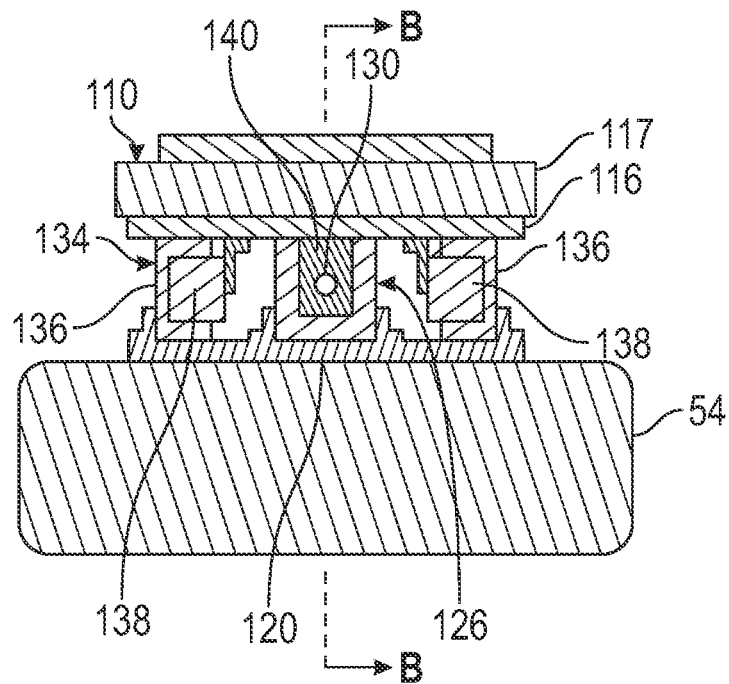
FIG. 4 is a front, cross-sectional view of the movement simulation apparatus of FIG. 1 viewed along line A-A.

The seat platform 110 is configured to support the passenger 11 over the first seat 50a. The seat platform 110 may have various components and structures suitable for supporting the passenger 11. In the example of FIGS. 2-4, the seat platform 110 includes a rigid member 116 and a cushion 117 thereon and secured thereto. Optionally, the seat platform 110 may include a seatbelt 112 configured to restrain the passenger 11 on the seat platform 110. In some embodiments, the seat platform 110 may be placed on top of the base 54 which typically includes a seat cover and seat foam. As another option, in some embodiments, portions of a base 54 of the first seat 50a may be removed, such as the seat cover and seat foam, to define a cavity and the seat platform 110 may be located in the cavity such that an upper surface of the seat platform 110 is located substantially flush with a structural portion or the removed seat cover portion of the base 54 of the first seat 50a.

The sliding assembly 134 slidably couples the seat platform 110 to the frame 118. The sliding assembly 134 may have various components and structures suitable for providing a sliding coupling between the seat platform 110 and the frame 118. In the example of FIGS. 2-4, the sliding assembly 134 includes a pair of drawer slide assemblies that each includes at least a fixed member 136 secured to the frame 118 and a telescoping member 138 secured to the rigid member 116. The telescoping member 138 may include rollers in contact with the fixed member 136 to provide a sliding relationship therebetween. The fixed member 136 and telescoping member 138 can include more than two pieces per side if more motion than is achievable by two pieces is desired.

The frame 118 is configured to be secured within the vehicle 10 in a fixed position relative to the first seat 50a. The frame 118 may have various components and structures suitable for securing the movement simulation apparatus relative to the first seat 50a. In the example of FIGS. 2-4, the frame 118 includes a platform support plate 120 configured to support the seat platform 110 and the sliding assembly 134, and a seat attachment device 122 coupled to the platform support plate 120 configured to secure the platform support plate 120 to the first seat 50a. The seat attachment device 122 may include one or more fasteners, clamps, or other securing members configured to be secured to the first seat 50a. Optionally, the platform support plate 120 may be coupled to the seat attachment device 122 with a pivoting joint 124 which enables the seat platform 110 to rotate about a perpendicular axis relative to the seat base 54 to allow the simulation of passenger motion in an angled trajectory such as during a swerve during braking or in an angle impact during a collision. In this example, the seat attachment device 122 is configured to be secured to a rear portion of a base 54 of the first seat 50a and extend at least partially through a space between the base 54 and a backrest 52 of the first seat 50a. In various embodiments, the frame 118 may be secured to the first seat 50a in a manner that provides for the movement simulation apparatus to move with the base 54 as the base 54 is adjusted in forward and/or rearward directions, up and/or down direction, and/or in tilt orientation. In various embodiments, the frame 118 may support the seat platform 110 in a manner such that weight applied to the seat platform 110, for example, the weight of the passenger 11 when seated thereon, is: a) distributed, b) not distributed, or c) partially distributed to the first seat 50a and/or the upper surfaces of the base 54 of the first seat 50a.

The propulsion apparatus 126 is configured to controllably displace the seat platform 110 relative to the frame 118 on the sliding assembly 134. In this example, the propulsion apparatus 126 includes a motor 114 configured to rotate a screw drive 130 threadedly coupled to a flange 140 of the rigid member 116. Rotation of the screw drive 130 causes the seat platform 110 to move either in towards the front 60 of the vehicle 10 or the rear 62 of the vehicle 10, depending on the direction of rotation. The propulsion apparatus 126 may be operated manually (by the passenger 11 or by another individual) using a remote device in wired or wireless communication with the motor 114, or may be operated automatically by a controller (e.g., the controller 34) according to preprogramed instructions configured to move the seat platform 110 according to one of a plurality of prescribed low speed profiles. In various embodiments, the seat platform 110 and/or the propulsion apparatus 126 may be configured to allow for adjustment of a plan view angle of articulation and/or adjustment of tilt.

A contact switch or force sensor 128 may be located on the body 14 of the vehicle 10 forward of the first seat 50a. The force sensor 128 may be configured to cease forward movement of the seat platform 110 upon sensing a force applied to the force sensor 128, for example, as a result of contact with legs of the passenger 11.

Figure 5:
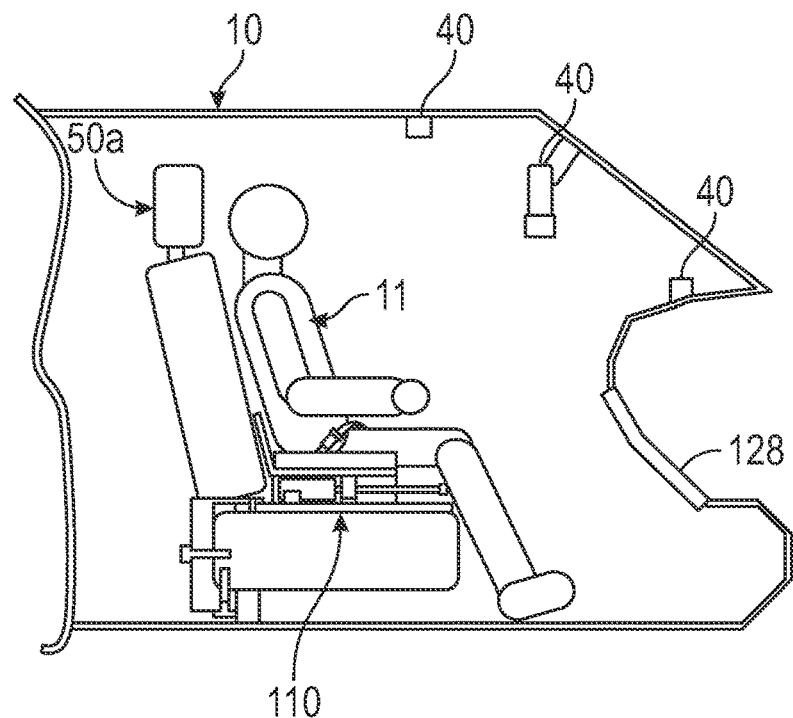
FIGS. 5 and 6 include isolated side views representing a passenger seated on the movement simulation apparatus of FIGS. 2-4 while located in a maximum rearward position and a maximum forward position, respectively.
Figure 6:
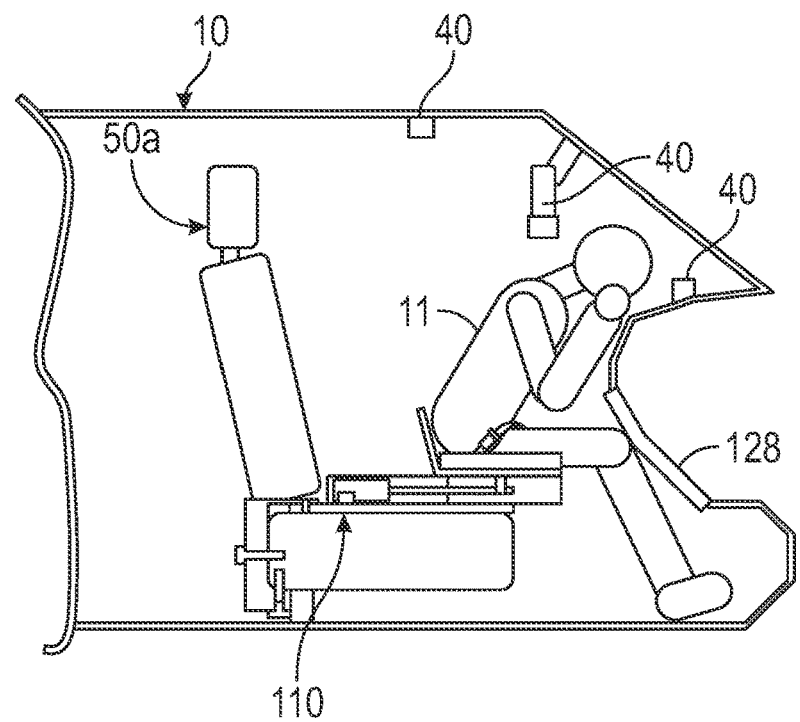

FIGS. 5 and 6 illustrate an exemplary operation of the movement simulation apparatus within the vehicle 10. FIG. 5 presents the seat platform 110 at a maximum rearward position wherein the passenger 11 seated thereon is in a position substantially similar as if the passenger 11 were sitting in the first seat 50a without the movement simulation apparatus. FIG. 6 presents the seat platform 110 at a maximum forward position wherein the passenger 11 seated thereon is in a position that may occur in an actual braking, collision, or braking and collision event, for example, when the passenger 11 is not restrained to the seat with a seat belt. The seat platform 110 may transition between the maximum rearward position and the maximum forward position by operation of the propulsion apparatus 126 simulating the passenger sliding forward on the seat base 54.

Figure 7:
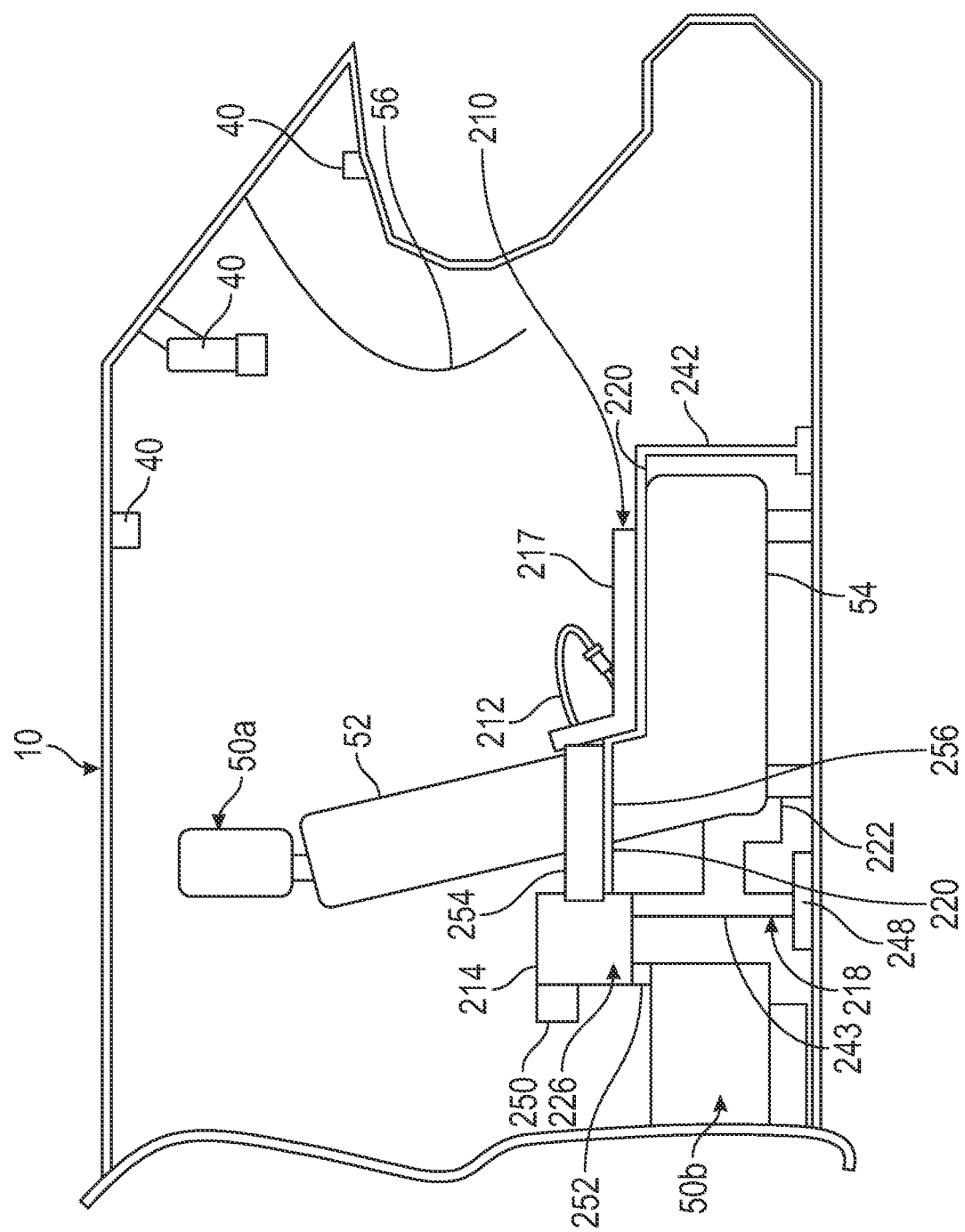
FIG. 7 an isolated side view representing portions of the vehicle and vehicle collision simulation system of FIG. 1, including a movement simulation apparatus in accordance with a second embodiment.
Figure 8:
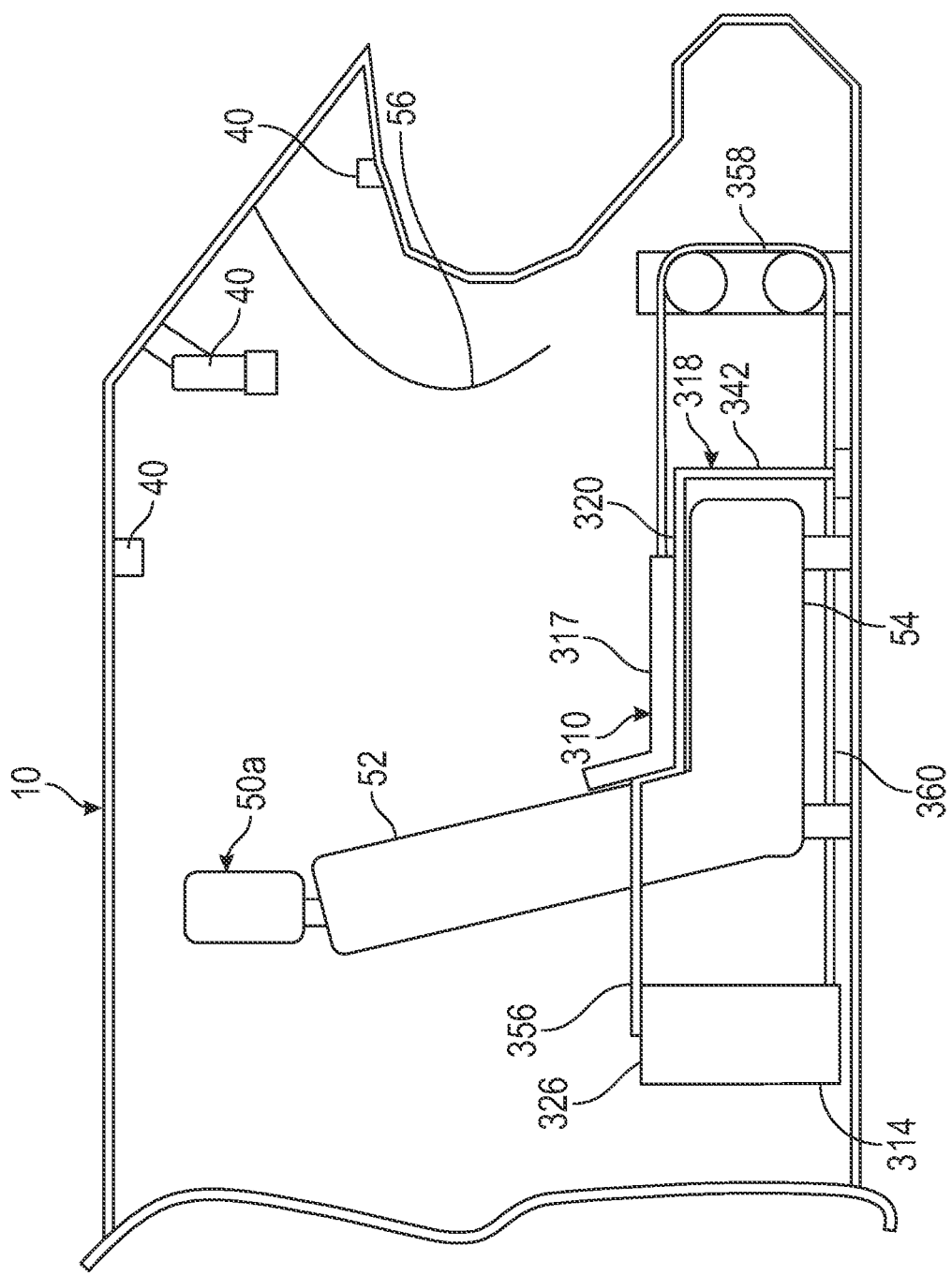
FIG. 8 an isolated side view representing portions of the vehicle and vehicle collision simulation system of FIG. 1, including a movement simulation apparatus in accordance with a third embodiment.
Figure 9:
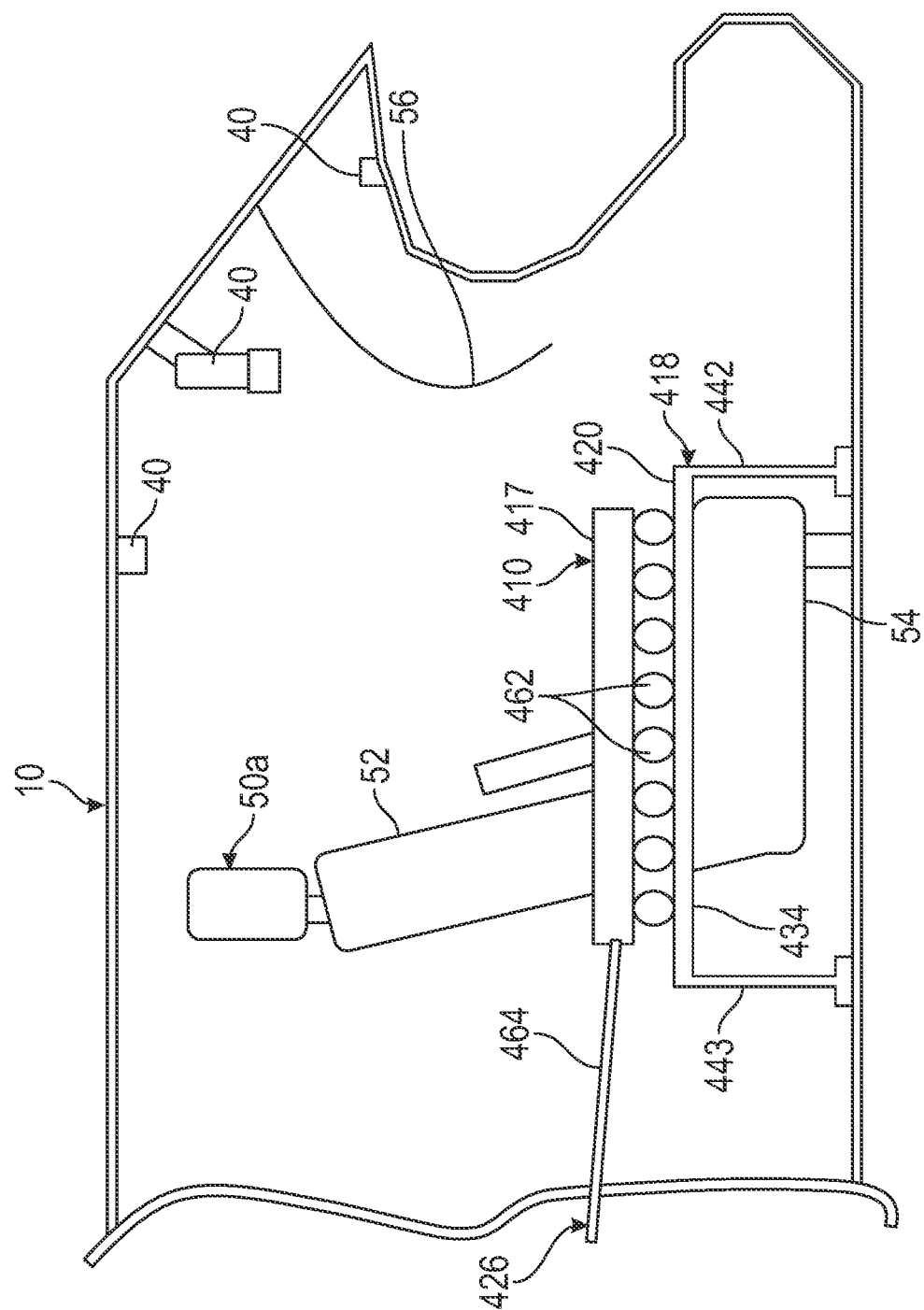
FIG. 9 an isolated side view representing portions of the vehicle and vehicle collision simulation system of FIG. 1, including a movement simulation apparatus in accordance with a fourth embodiment.

FIGS. 7-9 illustrate various nonlimiting examples of alternative structures for the movement simulation apparatus. It should be noted that these examples are merely for illustrative purposes and the movement simulation apparatus may have other configurations, including various combinations of the components represented in FIGS. 2-9.

For convenience, consistent reference numbers are used throughout FIGS. 2-9 to identify the same or functionally related/equivalent elements, but with a numerical prefix (1, 2, or 3, etc.) added to distinguish the particular embodiment from other embodiments of the of the figures. In view of similarities between the embodiments, the following discussion of FIGS. 7-9 will focus primarily on aspects of the embodiments that differ from the other embodiments in some notable or significant manner. Other aspects of the embodiments not discussed in any detail can be, in terms of structure, function, materials, etc., essentially as was described for one or more of the other embodiments, including the embodiment of FIGS. 2-6.

Referring to FIG. 7, the movement simulation apparatus includes a seat platform 210, a frame 218, and a propulsion apparatus 226. Optionally, the movement simulation apparatus may include a sliding assembly (not shown) between and coupling the seat platform 210 and the frame 218.

In this example, the frame 218 is supported by a floor of the vehicle 10 and the propulsion apparatus 226. Specifically, a platform support plate 220 is in contact with the floor by a first support member 242 and a second support member 243 (which supports the propulsion apparatus 226, which in turn supports an extension member 256 that is attached to the support plate 220). An optional seat attachment device 222 couples the second support member 243 to the rear of the first seat 50a. Optionally, one or both of the first support member 242 and a second support member 243 may include a shim stack 248 configured to adjust a height of the platform support plate 220 relative to the floor of the vehicle 10. In some embodiments, the shim stack 248 may be adjusted to match a height of the first seat 50a relative to the floor of the vehicle 10. In some embodiments, the first seat 50a can also support the support plate 220.

The propulsion apparatus 226 may include a motor 214 configured to extend and retract a piston or shaft 254 that is fixed to the seat platform 210. The shaft 254 and the extension member 256 may extend through a pass-through channel or hole formed in the backrest 52 of the first seat 50a. The propulsion apparatus 226 may further include an optional counterbalancing weight 250 configured to offset the weight of the shaft 254 and/or the seat platform 210, and an optional seat interface member 252 configured to contact the second seat 50b.

With this arrangement, the seat platform 210 may be moved in forward or rearward relative to the vehicle 10 by extension and/or retraction, respectively, of the shaft 254.

Referring to FIG. 8, the movement simulation apparatus includes a seat platform 310, a frame 318, and a propulsion apparatus 326. Optionally, the movement simulation apparatus may include a sliding assembly or track (not shown) between and coupling the seat platform 310 and the frame 318.

In this example, the propulsion apparatus 326 includes a motor 314 rearward of the first seat 50a, a pully system 358 forward of the first seat 50a, and a belt or cable 360 coupling the motor 314 to the seat platform 310 through the pully system 358. With this arrangement, the seat platform 310 may be moved forward relative to the vehicle 10 by operating the motor 314 to pull on the cable 360.

Referring to FIG. 9, the movement simulation apparatus includes a seat platform 410, a frame 418, a propulsion apparatus 426, and a sliding assembly 434.

In this example, the seat platform 410 and the platform support plate 420 on the frame 418 extend through the hole in the backrest 52 of the first seat 50a. The sliding assembly 434 includes a plurality of rollers 462 between the seat platform 410 and the platform support plate 420 that may be fixed either to the seat platform 410 or the platform support plate 420. The propulsion apparatus 426 includes a push bar 464 configured to be used to push the seat platform 410 in a direction forward relative to the vehicle 10. In some embodiments, the push bar 464 may be fixed to the seat platform 410 such that the push bar 464 may be pulled to move the seat platform 410 rearwards relative to the vehicle 10. The push bar 464 may be operated manually or may be coupled to a motor (not shown). In various embodiments, the push bar 464 may be omitted, and the seat platform 410 may be moved forward toward the front 60 of the vehicle 10 and rearward toward the rear 62 of the vehicle 10 with the passenger's legs pulling the passenger forward or pushing the passenger rearward via their interaction with the floor while in the seated position.

Figure 10:
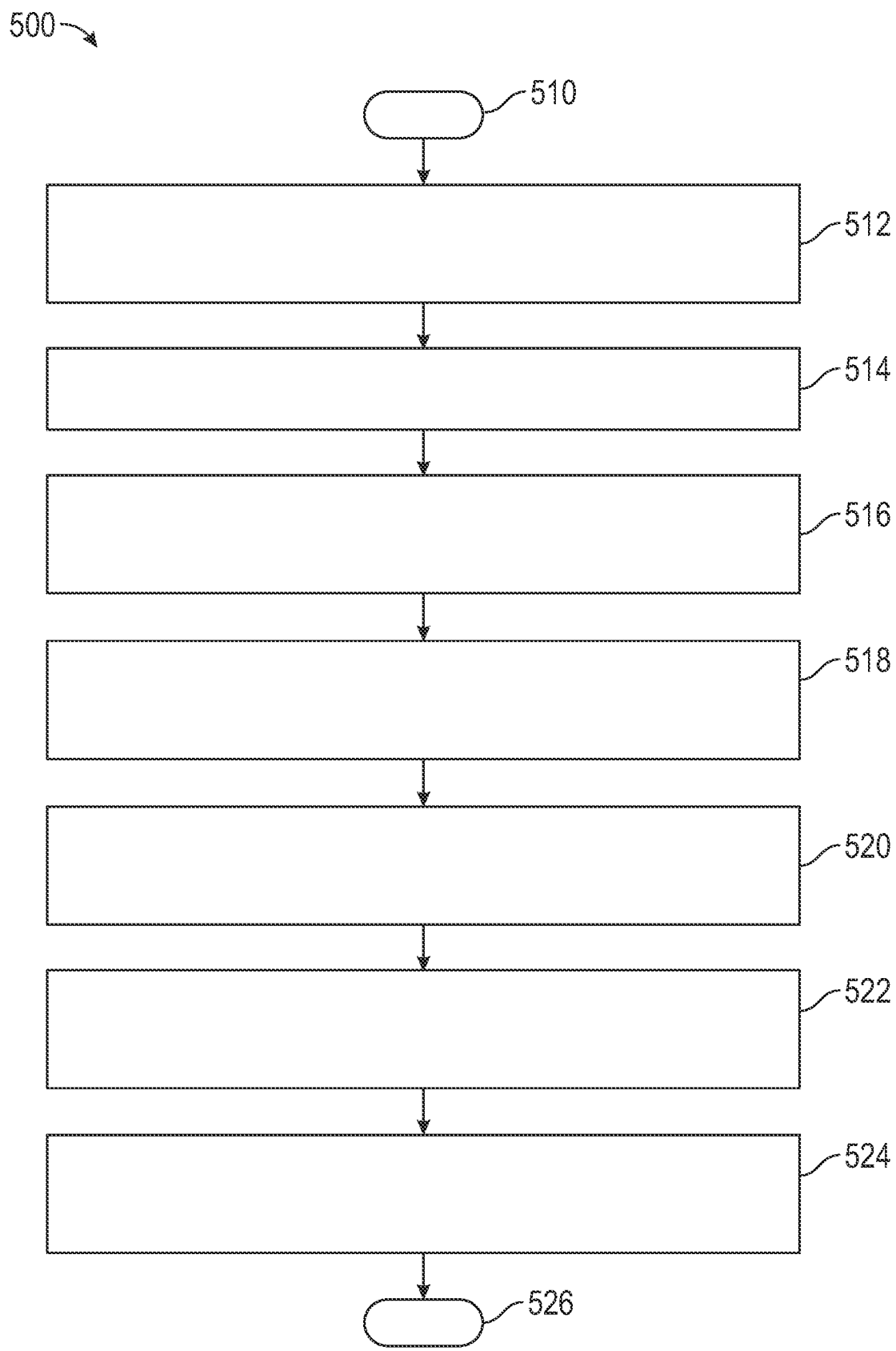
FIG. 10 is a flowchart of a method for vehicle collision simulations as performed by any one of the systems of FIGS. 3-9 in the vehicle of FIG. 1, in accordance with exemplary embodiments.

With reference now to FIG. 10 and with continued reference to FIGS. 1-9, a flowchart provides a method 500 for simulating vehicle braking, collisions, or braking and collisions and collecting data during these simulated events relating to the movements and/or positions of a passenger as performed by the system 100, in accordance with exemplary embodiments. As can be appreciated in light of the disclosure, the order of operation within the method 500 is not limited to the sequential execution as illustrated in FIG. 10, but may be performed in one or more varying orders as applicable and in accordance with the present disclosure. For convenience, the method 500 will be described in reference to the vehicle 10 of FIG. 1 and to the movement simulation apparatus of FIGS. 2-6. However, the method 500 is not limited to the vehicle 10 or the movement simulation apparatus of FIGS. 2-6, and may be performed with other vehicles and/or other movement simulation apparatuses, including but not limited to the movement simulation apparatuses of FIGS. 7-9.

In one example, the method 500 may start at 510. At 512, the method 500 may include installing a movement simulation apparatus within a vehicle such that a seat platform thereof is located on or above a seat of the vehicle. At 514, the method 500 may include positioning the passenger 11 on the seat platform 110 of the movement simulation apparatus (e.g., as represented in FIG. 5). The passenger 11 may be positioned in various seated positions including various angles, locations, weight distributions, and the like. The seat platform 110 may be initially positioned in the maximum rearward position, or at any position between the maximum rearward position and the maximum forward position. In various embodiments, the passenger 11 may be holding one or more objects having various sizes (e.g., phones, tablets, laptops, packages, purses, etc.). The passenger 11 may be various ages and/or have various heights, weights, body shapes, etc. In some embodiments, the passenger 11 may be an infant or child in an infant safety seat secured to the seat platform 110 in a manner similar to how the infant safety seat is configured to secured to a seat of a vehicle or via seatbelt 112. In some embodiments, an infant safety seat may be secured to the first seat 50a and the seat platform 110 may be located in a position above the infant safety seat. In some embodiments, the passenger 11 may be a living human being and in other embodiments the passenger 11 may be a replica of a human being (e.g., a crash test dummy). In various embodiments, the passenger 11 may be secured to the seat platform 110 with the seatbelt 112. In various embodiments, the passenger 11, the child safety seat, or the infant safety seat may not be secured to the seat platform 110.

At 516, the method 500 may include performing a deceleration simulation that includes displacing the seat platform 110 with the passenger 11 thereon forward relative to the vehicle 10. In various embodiments, the seat platform 110 is moved forward until the passenger 11 contacts a portion of the vehicle 10 forward of the first seat 50a (e.g., as represented in FIG. 6). The seat platform 110 may be moved in the forward direction at various rates of speed. In various embodiments, the rate of speed of the seat platform 110 is sufficiently slow to ensure or reduce the likelihood of injury to the passenger 11. In such embodiments, the rate of speed of the seat platform 110 causes the passenger 11 to move forward at a rate of speed significantly slower than the passenger 11 would move during an actual panic braking and/or collision event in the vehicle 10. In some embodiments, the rate of speed of the seat platform 110 is sufficiently slow such that the passenger 11 is not caused to be propelled forward uncontrollably, that is, the forces exerted on the passenger 11 are sufficiently small such that the passenger 11 is able to maintain control of their bodily movements and/or positions throughout the simulated collision event. In such embodiments, the passenger 11 may exaggerate movements of their body and/or mimic or act to artificially produce choreographed kinematic body movements representative of those that may occur during an actual braking or collision event. For example, the deceleration simulation may include moving the passenger 11 slowly forward on the seat platform 110 until a portion of the passenger 11 contacts the vehicle 10, for example, with their knees, and the passenger 11 may lean forward to place their hands and head against the instrument panel of the vehicle 10 during the seat platform movement, after knee contact or during both of these. In various embodiments, the deceleration simulation may also include moving the seat platform 110 and passenger 11 rearward near the end of the deceleration simulation, for example, in a manner generally opposite of the forward motion earlier in the deceleration simulation. This rearward movement can be accomplished via manually initiated movement or movement via the motor 114. In various embodiments, the passenger 11 may be displaced in a forward direction at a rate of speed which enables the passenger 11 to move from his/her original seated position to a forward position in a time duration of about 3 to 20 seconds. In various embodiments, the passenger 11 may subsequently be displaced in a rearward direction to a position similar to their original seated position in a time duration of about 3 to 40 seconds. Generally, these exemplary time durations are slow enough to ensure that the passenger 11 will not be injured during the motion.

At 518, the method 500 may include sensing the movements and/or positions of the passenger 11 during the deceleration simulation with one or more sensors. In various embodiments, the sensor(s) used to sense the passenger 11 may be located within the vehicle 10 and/or outside of the vehicle 10. In various embodiments, the sensor(s) may be or may include one or more of the sensing devices 40a-40n of the vehicle 10. For example, the sensor(s) may include various cameras, radar sensors, etc.

At 520, the method 500 may include generating and storing simulation input data that includes the sensed movements and/or positions of the passenger 11 during and throughout the deceleration simulation as sensed and transmitted from the sensor(s). The simulation input data may be stored onboard the vehicle 10 (e.g., in the data storage device 32 or the storage device or media 46) or stored remotely in a separate computing system. In some embodiments, the simulation input data may be segmented between signals received from sensors of the vehicle 10 and additional sensors used during the deceleration simulation. In some embodiments, the simulation input data may include sensed movements and/or positions of the passenger 11, child safety seat (if used) or both during the deceleration simulation combined with simulated operation data (also referred to herein as artificial data) mapped to the deceleration simulation. For example, the simulation input data may include, but is not limited to utilizing the following operational parameters: simulated system activation signal detection over time, simulated in-seat occupancy over time, simulated vehicle longitudinal acceleration over time, simulated vehicle braking signal and/or level over time, simulated vehicle speed signal over time, simulated incoming object relative velocity signal over time, simulated seatbelt buckle signal over time, and sensed passenger landmark trajectory over time.

In order to use the simulation input data for braking, collision, or braking and collision event studies and/or as input in systems, such as an airbag suppression system, the method 500 may include, at 522, modifying the simulation input data to better simulate an actual panic braking and/or collision event. For example, the simulation input data may be modified such that the movements and/or positions of the passenger 11 move at a rate of speed that more closely matches what may occur during an actual panic braking and/or collision event under certain similar conditions, such as the passenger 11 being unrestrained (i.e., seat belt unbuckled), certain seated positions, holding certain objects, etc. Stated another way, the rate of speed of the sensed movements and/or change in positions of the passenger 11 may be increased from a first sample rate obtained during the deceleration simulation to a shorter, second sample rate which is more representative of real time events associated with panic braking and collision events. Similarly, any artificial data, for example, relating to the operation of the vehicle 10 during the deceleration simulation, may be increased in rate of speed by the same extent as the sensed movements and/or change in positions of the passenger 11.

Figure 11:
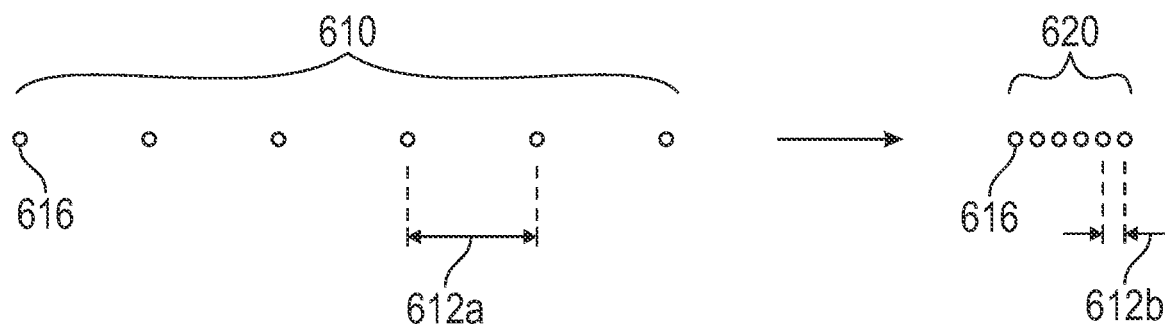
FIGS. 11-13 represent methods for modifying simulation input data collected by any one of the systems of FIGS. 3-9 in the vehicle of FIG. 1, in accordance with exemplary embodiments.
Figure 12:
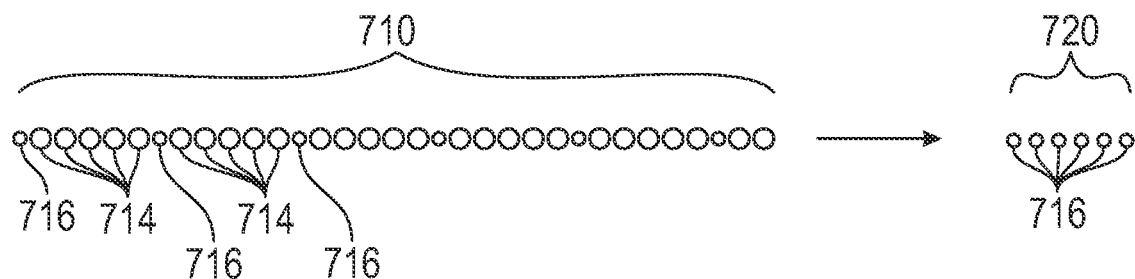
Figure 13:
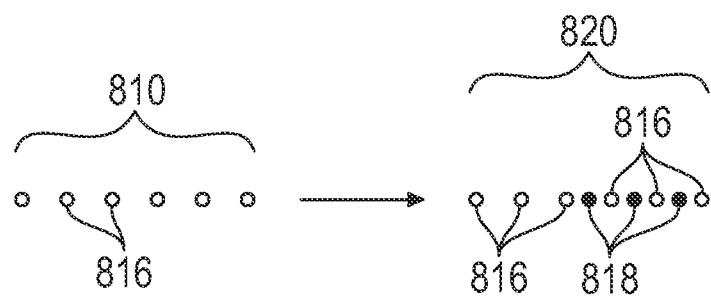

Referring to FIGS. 11-13, various nonlimiting methods for modifying the simulation input data are presented. In these examples, a set of data points is provided that includes a series of dots each representing a sensed observable condition obtained at a specific corresponding point in time and spacing between the dots representing time passage between sensing of the observable conditions, that is, a sample rate. For convenience, the simulation input data will be discussed in reference to a video recorded by a camera during a simulated collision event wherein each dot is a frame of the video. In these examples, the set of data points and/or the sample rate of the simulation input data is modified to produce modified simulation input data having a time domain representative of real time events associated with actual panic braking and/or collision events.

In FIG. 11, a first set 610 of frames 616 having a first sample rate and a time duration 612a between each of the frames 616 is reprocessed to have a shorter time duration 612b between each of the frames 616 to generate a second set 620 of the frames 616 having a second sample rate. For example, a frame rate of the first set 610 of the frames 616 may be one frame per 100 milliseconds and a frame rate of the second set 620 of frames 616 may be one frame per 10 milliseconds.

In FIG. 12, a third set 710 of frames 714 and 716 having a third sample rate is reprocessed to eliminate some of the frames 714 to generate a fourth set 720 of the frames 716 having a fourth sample rate. In this example, four out of every five frames of the third set 710 of frames 714 and 716 is removed, and in this manner the duration of the deceleration simulation is reduced. Optionally, the duration between each of the remaining frames 716 can be made longer or shorter than the original duration between frames 714 and 716 (i.e., the third sample rate).

In FIG. 13, a fifth set 810 of frames 816 having a fifth sample rate is reprocessed to add additional frames 818 in response to preprogramed conditions of the simulated braking or collision simulation to generate a sixth set 820 of frames 816/818 at a sixth sample rate. For example, the additional frames 818 may be added upon a determination that the passenger 11 has moved past a forward position threshold, in response to determination that a braking event is or has occurred, and/or in response to a determination that a vehicle longitudinal acceleration has exceed an acceleration threshold. These preprogramed conditions may trigger one or more of the sensors (e.g., one or more of the sensors 40a-40n) to operate at a faster sample rate resulting in the additional frames 818. In various embodiments, the sixth sample rate may be non-uniform and/or may have an increased sample rate.

In various embodiments, two or more of the methods represented in FIGS. 11-13 may be combined to modify the simulation input data.

At 524, the method 500 may include using the simulation input data to train and/or implement an algorithm for an airbag suppression system of the vehicle 10. For example, the airbag suppression system may compare the simulation input data to reference data corresponding to a preprogrammed airbag suppression zone 56 to determine whether to suppress deployment of the airbag during an actual braking, collision, or braking and collision event based on whether the passenger 11 has physically passed the airbag suppression zone 56. The algorithm may include various types of algorithms, machine learning techniques, and the like and may consider various parameters and criteria. Nonlimiting examples of airbag suppression systems and algorithms therefor are disclosed in U.S. patent application Ser. No. 18/080,830 to Thomas et al., filed Dec. 14, 2022, and U.S. patent application Ser. No. 18/081,133 to Thomas et al., filed Dec. 14, 2022, both of which are incorporated herein in their entireties.

The method 500 may be repeated while changing one or more conditions with each repetition, such as the initial position of the passenger 11, objects held by the passenger 11 or otherwise located within the vehicle 10, movements of the passenger 11 during the deceleration simulation, etc., to produce a plurality of data sets each associated with a possible braking, collision, or braking and collision event scenario. The conditions modified during each repetition may be attributed to one or more noise factors that may affect airbag suppression/enablement functionality and/or safety. The plurality of data sets may be stored in a database and used to train, validate, and/or implement an algorithm associated with the vehicle 10. For example, FIGS. 14-18 present various forward positions of the passenger 11 during deceleration simulations produced by the method 500 and the system 100 (in this example, using the movement simulation apparatus of FIG. 7). FIG. 14 illustrates an unrestrained passenger 11 leaning forward with the head contacting the instrument panel. FIG. 15 illustrates an unrestrained passenger 11 translated forward with the head and knees contacting the instrument panel.

FIG. 16 illustrates an unrestrained passenger 11 translated forward with the knees contacting the instrument panel and the hands bracing against the instrument panel. FIG. 17 illustrates a seat belted passenger 11 translated a small distance forward with an object on the passenger's lap contacting the instrument panel. FIG. 18 illustrates an unbelted laterally facing passenger 11 translated forward so that the arm contacts the instrument panel, and the head contacts the windshield. During all of the passenger 11 motions to achieve these positions and the motions back to near the starting position, the passenger 11 can, for example, lean, move their arms, move their legs, propel objects with their hands, etc. to simulate occupant motions during a braking, collision, or braking and collision event. In general, an algorithm may use these data sets to determine whether to deploy an airbag during an actual braking, collision, or braking and collision event. In one such embodiment, the algorithm may determine that the airbag should be suppressed for the conditions of FIGS. 14, 15, and 18, and should be enabled for the conditions of FIGS. 16 and 17. The suppression or enablement of the airbag may be based on the location of the passenger 11 relative to the airbag suppression zone 56.

At 522, the method 500 may end.

In various embodiments, the braking and collision simulation system 100 may include a lower body movement device (not shown) similar to the simulated movement apparatus that is configured to be located on the floor of the vehicle 10 and used to support the feet of the passenger 11 during the deceleration simulation. A control method similar to that described herein in reference to the simulated movement apparatus may be implemented to control the motion of the feet and/or lower body of the passenger 11 during the deceleration simulation. For example, the lower body movement device may include a foot support platform, a frame secured to the vehicle, slider assembly coupling the foot support platform to the frame and configured to provide for displacing the foot support platform in forward and/or rearward directions, and optionally a propulsion apparatus configured to propel the foot support platform on the slider assembly, In various embodiments, the lower body movement device may be configured for free sliding motion, propelled motion at a rate matching a rate of motion of the simulated movement apparatus, or propelled at a rate independent of the motion of the simulated movement apparatus.

The systems and methods disclosed herein provide various benefits over certain existing systems and methods. For example, vehicle collision simulations often use artificial passengers as substitutions for human passengers. However, the artificial passengers may not always produce bodily movements and/or positions during vehicle collision simulations that accurately mimic the movements of actual human passengers. The systems and methods disclosed herein are capable of addressing this issue by allowing for the safe use of human passengers during deceleration simulations. For example, the systems and methods may allow for locating a human passenger on the seat platform (e.g., the seat platform 110, 210, 310, or 410), sliding the seat platform with the passenger thereon toward the front of the vehicle during a deceleration simulation, optionally sliding the seat platform with the passenger thereon toward the rear of the vehicle after the forward movement has stopped, sensing the movements and/or positions of the passenger during the deceleration simulation with one or more sensors, and generating simulation input data that includes the movements and/or positions of the passenger sensed by the one or more sensors during the deceleration simulation. In this manner, the systems and methods disclosed herein provide for vehicle braking, collision, or braking and collision simulations that produce bodily movements and/or positions of passengers similar to those that may occur by human passengers during actual vehicle braking, collision, or braking and collision events. In various embodiments, the systems and methods may generate simulation input data that includes realistic human arm motion, realistic human lower torso motion, and/or realistic motion of objects held by a human during deceleration simulations.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A system, comprising:
a seat platform configured to be secured within a vehicle such that the seat platform is located on or above a seat of the vehicle, the seat platform configured to be controllably displaced relative to the seat in at least a forward direction towards the front of the vehicle while having a passenger disposed on the seat platform during a deceleration simulation that includes displacing the seat platform having the passenger disposed thereon from an initial position toward the front of the vehicle;
one or more sensors configured to gather sensor data indicative of spatial characteristics of the passenger during the deceleration simulation, wherein the one or more sensors includes at least one sensor of the vehicle; and
a computing system configured to, by one or more processors:
receive the sensor data from the one or more sensors;
generate simulation input data based on the sensor data, wherein the simulation input data include a plurality of data points indicative of movements or positions of the passenger as sensed by the one or more sensors at a first sample rate; and
modify the simulation input data to change the first sample rate to a second sample rate, wherein the second sample rate has a time domain associated with a real-time vehicle braking event, a real-time collision event, or a real-time braking and collision event.

2. The system of claim 1, wherein the computing system is configured to, by the one or more processors, generate the simulation input data such that the simulation input data is usable to train, validate, and/or implement an algorithm for an airbag suppression system.

3. The system of claim 2, wherein the algorithm for the airbag suppression system is modified to suppress deployment of an airbag.

4. The system of claim 1, further comprising a propulsion apparatus configured to controllably displace the seat platform in at least one of the forward direction towards the front of the vehicle and a rearward direction towards the rear of the vehicle.

5. The system of claim 4, wherein the propulsion apparatus is configured to displace the seat platform during the deceleration simulation at a rate of speed sufficiently slow such that the passenger remains unharmed.

6. The system of claim 1, further comprising:
a frame configured to be secured within the vehicle in a fixed position; and
a slider assembly coupling the seat platform to the frame.

7. The system of claim 6, further comprising a propulsion apparatus on the slider assembly that includes a motor operable to controllably displace the seat platform in at least one of the forward direction towards the front of the vehicle and a rearward direction towards the rear of the vehicle.

8. The system of claim 1, further comprising a contact sensor or a force sensor located within the vehicle and towards the front of the vehicle relative to the seat, wherein the contact sensor or the force sensor is configured to cease displacement of the seat platform in the forward direction in response to sensing contact therewith or a force applied thereto that exceeds a threshold.

9. The system of claim 1, wherein the simulation input data further includes one or more simulated operational parameters that are mapped over time to the displacement of the seat platform.

10. The system of claim 1, wherein the computing system is configured to, by the one or more processors, modify the simulation input data by:
reducing a duration of time between at least some of the plurality of data points;
eliminating some of the data points to reduce a duration of the deceleration simulation;
eliminating some of the data points and reducing a duration of time between at least some of the remaining data points; or adding additional data points in response to preprogramed conditions.

11. A method, comprising:
initiating a deceleration simulation that includes displacing a seat platform of a movement simulation apparatus secured within a vehicle and having a passenger disposed thereon from an initial position in a forward direction toward a front of the vehicle, wherein the seat platform is located on or above a seat of the vehicle;
sensing, by one or more sensors, sensor data indicative of spatial characteristics of the passenger during the deceleration simulation, wherein at least one of the one or more sensors is a sensor of the vehicle;
obtaining, by a computing system that includes one or more processors, the sensor data from the one or more sensors;
generating, by the computing system with the one or more processors, simulation input data based on the sensor data, wherein the simulation input data include a plurality of data points indicative of movements or positions of the passenger as sensed by the one or more sensors at a first sample rate; and
modifying, by the computing system with the one or more processors, the simulation input data to change the first sample rate to a second sample rate, wherein the second sample rate has a time domain associated with a real-time vehicle braking event, a real-time vehicle collision event, or a real-time vehicle braking and collision event.

12. The method of claim 11, further comprising using the simulation input data to train, validate, and/or implement an algorithm for an airbag suppression system.

13. The method of claim 12, further comprising modifying the algorithm to suppress deployment of an airbag.

14. The method of claim 11, wherein displacing the seat platform having the passenger disposed thereon is performed by operating a propulsion apparatus of the movement simulation apparatus.

15. The method of claim 11, wherein performing the deceleration simulation includes ceasing movement of the seat platform in the forward direction in response to contact by the passenger or an object with a contact sensor or a force sensor located within the vehicle and towards the front of the vehicle relative to the seat.

16. The method of claim 11, wherein the simulation input data further includes one or more simulated operational parameters that are mapped over time to the displacement of the seat platform.

17. The method of claim 11, wherein displacing the seat platform of the movement simulation apparatus is performed at a rate of speed sufficiently slow such that the passenger remains unharmed.

18. The method of claim 11, wherein modifying the simulation input data is performed by:
   reducing a duration of time between at least some of the data points;
   eliminating some of the data points to reduce a duration of the deceleration simulation;
   eliminating some of the data points and reducing a duration of time between at least some of the remaining data points; or
   adding additional data points in response to preprogramed conditions.

19. The method of claim 11, wherein initiating the deceleration simulation includes having the passenger perform choreographed motion to reflect anticipated occupant movement in an actual braking, collision, or braking and collision event during displacement of the seat platform.

20. The method of claim 19, wherein the passenger is not wearing a seat belt during the deceleration simulation.

\* \* \* \* \*